(12) United States Patent
Montoliu Gombau et al.

(10) Patent No.: US 7,905,929 B2
(45) Date of Patent: Mar. 15, 2011

(54) GLYCOL BASED PIGMENT PREPARATION FOR MASS DYEING OF POLYACRYLONITRILE FIBERS

(75) Inventors: Rosa Maria Montoliu Gombau, Barcelona (ES); Montserrat Fernández Balsells, Cerdanyola del Vallès (ES)

(73) Assignee: Clariant Finance (BVI) Limited, Tortola (VG)

( * ) Notice: Subject to any disclaimer, the term of this patent is extended or adjusted under 35 U.S.C. 154(b) by 194 days.

(21) Appl. No.: 12/287,451

(22) Filed: Oct. 9, 2008

(65) Prior Publication Data

US 2009/0094764 A1 Apr. 16, 2009

(30) Foreign Application Priority Data

Oct. 10, 2007 (EP) .................................. 07019767

(51) Int. Cl.
*D06P 3/70* (2006.01)
(52) U.S. Cl. ................ 8/927; 8/510; 8/637.1
(58) Field of Classification Search ........... 8/510, 637.1, 8/927
See application file for complete search history.

(56) References Cited

U.S. PATENT DOCUMENTS

| | | | |
|---|---|---|---|
| 3,730,747 A | 5/1973 | Belde et al. | |
| 3,960,591 A | 6/1976 | Deubel et al. | |
| 4,260,540 A * | 4/1981 | Rolf et al. | 524/87 |
| 5,207,825 A * | 5/1993 | Schwarz, Jr. | 106/31.29 |
| 5,760,124 A * | 6/1998 | Listigovers et al. | 524/505 |
| 6,528,162 B1 * | 3/2003 | Teranishi et al. | 428/372 |
| 6,924,035 B2 | 8/2005 | Auweter et al. | |
| 7,285,592 B2 | 10/2007 | Harz et al. | |
| 2003/0177943 A1 | 9/2003 | Auweter et al. | |
| 2004/0171738 A1 | 9/2004 | Harz et al. | |
| 2006/0229382 A1 | 10/2006 | Schweikart et al. | |
| 2007/0261596 A1 | 11/2007 | Fechner et al. | |

FOREIGN PATENT DOCUMENTS

| | | |
|---|---|---|
| DE | 2001459 | 7/1971 |
| DE | 224043 | 6/1985 |
| DE | 102004051455 | 4/2006 |
| GB | 1196816 | 7/1970 |
| GB | 1336394 | 11/1973 |
| GB | 1450628 | 9/1976 |
| JP | 402269825 | * 11/1990 |
| WO | WO 99/38920 | 8/1999 |
| WO | WO 02/26892 | 4/2002 |
| WO | WO 03/008510 | 1/2003 |
| WO | WO 2004/094541 | 11/2004 |
| WO | WO 2006/045396 | 5/2006 |
| WO | WO 2006/083000 | 8/2006 |

OTHER PUBLICATIONS

European Search Report for EP 07019767, Mailed Nov. 4, 2008.
Database WPI Week 198516, Thompson Scientific London, GB; AN 1985-096749, XP002497496 & JP 60045689 (Abstract); Mar. 12, 1985.
English Abstract for JP 3104916, May 1, 1991.
English Abstract for DD 224043, Jun. 26, 1985.

* cited by examiner

*Primary Examiner* — Lorna M Douyon
*Assistant Examiner* — Amina Khan
(74) *Attorney, Agent, or Firm* — Anthony A. Bisulca

(57) ABSTRACT

The invention relates to a process for mass dyeing of polyacrylonitrile, wherein there is incorporated into a solution of acrylonitrile polymer or copolymer a pigment preparation which comprises
10 to 60% by weight of a pigment,
15 to 85% by weight of a glycol-based solvent,
5 to 25% by weight of a surfactant, and
0 to 10% by weight of customary additives,
the percentages being based on the total weight of the pigment preparation.

10 Claims, No Drawings

GLYCOL BASED PIGMENT PREPARATION FOR MASS DYEING OF POLYACRYLONITRILE FIBERS

The present invention relates to an improved process for mass dyeing of polyacrylonitrile.

The present invention further relates to novel pigment preparations which are suitable for the dyeing of polyacrylonitrile spinning solutions.

It has been known for a long time to dye polyacrylonitrile fibers with basic dyestuffs from aqueous solutions. Owing to the better fastness properties of pigments, the use of pigments is gaining more and more importance in the mass dyeing. For this, it is necessary to have the pigments very finely dispersed in the spinning solution so as to achieve an optimum tinctorial strength and levelness of the dyeing and to avoid clogged filters or spinning nozzles and broken filaments due to coarse agglomerates.

In the literature there are some examples of pigment preparations to be added to the mass before extruding the fibers. According to DD 224 043 A1 the preparation is done with a polyacrylonitrile solution itself where the pigment is added and milled.

DE 20 01 459 describes an aqueous pigment preparation containing zinc chloride for this purpose. Both patents describe an approach were the colorant/pigment is added into the liquid polymer solution and milled in the final formulation of the spinning solution. The carrier therefore is identical to the polymer or its precursors of the final fiber.

U.S. Pat. No. 3,960,591 discloses a pigment composition for the dyeing of polyacrylonitrile polymers and copolymers prepared by adding a polyacrylonitrile polymer or copolymer as a support in the preparation of formation of the pigment and working up the pigment in dry form to obtain a pulverulent composition suitable for dyeing a spinning solution of polyacrylonitrile. Here the pigment is added in a dry/pulverized form to the spinning solution.

In JP 3104916 is described the use of a pigment dispersed in an organic solvent, such as dimethylformamide, dimethyl sulfoxide, acetone, and then added together with an acrylic polymer solution to a solution of a polyacrylonitrile and the resultant mixture is spun. The carrier is determined by the solvent used for the solution of the polyacrylonitrile. Both the carrier for the colorant/pigment and the solvent for the polyacrylonitrile are identical.

All the state-of-the-art processes suffer from a cumbersome adaptation of the powder pigment and the desired solvent of the spinning solution. Pigment preparations as described in JP 3104916 are not universally compatible for all pigments and spinning solutions, and also lack sufficient storage stability.

The object of the present invention was to provide an easy-to-handle process for mass dyeing of polyacrylonitrile, which is broadly applicable for all desired spinning solutions and for different colors. For the process of the invention it is further desirable that the fiber producer can have at its disposal and store for a longer time stable and standardized pigment preparations of different colours.

A further object of the invention is to provide a pigment preparation which is broadly applicable for mass dyeing of polyacrylonitrile and which has a long storage stability and higher pigment loadings.

It was found, surprisingly that a glycol based pigment preparation as described below satisfies the requirements referred to above. It serves as a multifunctional solvent compatible in most of the state of the art solvents for the polyacrylonitrile spinning solution, offers a long shelf life and significantly higher pigment loadings compared to the preparations done by the fiber producer itself.

The invention now provides a process for mass dyeing of polyacrylonitrile, wherein there is incorporated into a solution of acrylonitrile polymer or copolymer a pigment preparation which comprises 10 to 60% by weight, preferably 15 to 40% by weight, especially 20 to 30% by weight, of a pigment, 15 to 85% by weight, preferably 30 to 75% by weight, especially 50 to 70% by weight, of a glycol-based solvent, 5 to 25% by weight, preferably 8 to 20% by weight, especially 9 to 17% by weight, of a surfactant, and 0 to 10% by weight, preferably 0 to 5% by weight, especially 0.01 to 3% by weight, of customary additives, the percentages being based on the total weight of the pigment preparation.

It is expedient to incorporate the pigment preparation in an amount of 2 to 20% by weight, preferably 2 to 15% by weight, based on the weight of the dyed polyacrylonitrile mass.

The incorporation can easily be done by stirring or any other mixing equipment.

After a homogeneous mixture has been obtained, the mixture is extruded into a bath containing e.g. dimethylformamide and water, to obtain polyacrylonitrile fibers already coloured.

The glycol-based solvent may comprise a glycolic compound selected from the group consisting of ethylene glycol, propylene glycol, diethylene glycol, dipropylene glycol, butylene glycol, triethylene glycol, polyethylene glycol, alpha-methyl-omega-hydroxy-polyethylene glycol ether, dimethyl polyethylene glycol ether, polypropylene glycol, dimethyl polypropylene glycol ether, and copolymers of ethylene glycol and propylene glycol. Mostly preferred is propylene glycol.

It is also possible to use a mixture of said glycol-based solvent with other solvents or hydrotropic substances, such as formamide, urea, tetramethyl urea, epsilon-caprolactame, N-methylpyrrolidone, 1,3-diethyl-imidazolidinone, thiodiglycol, methyl cellulose, glycerol, diglycerol, polyglycerol, gelatine, polyvinyl pyrrolidon, polyvinyl alcohol, polyvinyl imidazol.

The acrylonitrile polymer or copolymer is usually dissolved in an appropriate spinning solvent, such as dimethylformamide, dimethylsulfoxide or dimethylacetamide, most preferred dimethylformamide.

The invention further provides a pigment preparation, which is preferably substantially water-free, comprising 10 to 60% by weight, preferably 15 to 40% by weight, especially 20 to 30% by weight, of a pigment, 15 to 85% by weight, preferably 30 to 75% by weight, especially 50 to 70% by weight, of propylene glycol, 5 to 25% by weight, preferably 8 to 20% by weight, especially 9 to 17% by weight, of a surfactant, and 0 to 10% by weight, preferably 0 to 5% by weight, especially 0.01 to 3% by weight, of customary additives, the percentages being based on the total weight of the pigment preparation.

The term "substantially water-free" means that no water is added to the preparation, and the components, in particular the propylene glycol and the surfactants, have low contents of residual water. Preferably, the pigment preparation has a water-content of not more than 10% by weight, preferably not more than 5% by weight, measured by Karl Fischer method.

The invention further provides a pigment preparation, which is preferably substantially water-free, consisting of 10 to 60% by weight, preferably 15 to 40% by weight, especially 20 to 30% by weight, of a pigment, 15 to 85% by weight, preferably 30 to 75% by weight, especially 50 to 70% by weight, of propylene glycol, 5 to 25% by weight, preferably 8 to 20% by weight, especially 9 to 17% by weight, of a surfactant, and 0 to 10% by weight, preferably 0 to 5% by weight, especially 0.01 to 3% by weight, of customary additives, the percentages being based on the total weight of the pigment preparation.

The pigment to be employed in the present invention is a finely divided organic or inorganic pigment or a mixture of different organic and/or inorganic pigments. Suitable organic pigments include monoazo, disazo, laked azo, β-naphthol, naphthol AS, benzimidazolone, disazo condensation, and azo metal complex pigments, and polycyclic pigments such as phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline, and diketopyrrolopyrrole pigments, for example, or an acidic to alkaline carbon black from the group consisting of furnace blacks and gas blacks.

Among the stated organic pigments particular suitability is possessed by those which are very finely divided for the production of the preparations, with preferably 95% and more preferably 99% of the pigment particles possessing a size ≦500 nm.

As an exemplary selection of particularly preferred organic pigments mention may be made of carbon black pigments, such as gas blacks or furnace blacks; monoazo and disazo pigments, particularly the Colour Index pigments Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; β-naphthol and naphthol AS pigments, particularly the Colour Index pigments Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 256, Pigment Orange 5, Pigment Orange 38 or Pigment Brown 1; laked azo and metal complex pigments, particularly the Colour Index pigments Pigment Red 257, Pigment Orange 68 or Pigment Orange 70; benzimidazoline pigments, particularly the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, particularly the Colour Index pigments Pigment Yellow 139 or Pigment Yellow 173; phthalocyanine pigments, particularly the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone, and thioindigo pigments, particularly the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, particularly the Colour Index pigments Pigment Red 169, Pigment Blue 56 or Pigment Blue 61; diketopyrrolopyrrole pigments, particularly the Colour Index pigments Pigment Red 254, Pigment Red 255, Pigment Red 264, Pigment Red 270, Pigment Red 272, Pigment Orange 71, Pigment Orange 73, and Pigment Orange 81.

Examples of suitable inorganic pigments include titanium dioxides, zinc sulfides, zinc oxides, iron oxides, manganese iron oxides, chromium oxides, ultramarine, nickel or chromium antimony titanium oxides, cobalt oxides, mixed oxides of cobalt and aluminum, rutile mixed-phase pigments, sulfides of rare earths, bismuth vanadates, and extender pigments.

Especially preferred pigments are C.I. Pigment Black 7, C.I. Pigment Blue 15:3, C.I. Pigment Green 7, C.I. Pigment Yellow 213, and C.I. Pigment Red 254.

As surfactants use is made, for example, of cationic, anionic, amphoteric or nonionic compounds which promote pigment wetting (wetting agents) which are known in the art and which are listed e.g. in WO 2006/045 396 A1.

Further customary additives can be thickeners, preservatives, biocides, viscosity stabilizers, emulsifiers, grinding assistants, fillers, and hydrotropic retention agents, antisettling agents, light stabilizers, antioxidants, devolatilizers, defoamers, foam reducers, anticaking agents and rheology improvers.

The present invention additionally provides a process for producing the pigment preparation of the invention, which comprises dispersing the pigment in the form of powder or granules in the glycol and surfactant, and optionally milling, e.g. in a bead mill, until the particle size reaches less than 1 μm, and optionally mixing in the further customary additives.

The pigment preparations of the invention are in principle suitable for coloring macromolecular materials of all kinds, examples being natural and synthetic fiber materials.

The pigment compositions of the invention, however, are particularly suitable for the dyeing of spinning solutions of polyacrylonitrile fibers.

EXAMPLES

Production of a Pigment Preparation

The pigment, in the form of powder, is pasted in glycol together with the dispersants and the other additives, and then homogenized and predispersed using a dissolver or other suitable apparatus. Subsequent fine dispersion took place by means of a bead mill or another suitable dispersing apparatus, with milling taking place with siliquarzite beads or zirconium mixed oxide beads of size d=0.5-1 mm or d=0.3-1 mm, accompanied by cooling, until the desired color strength and colorisitic properties were obtained. Thereafter the dispersion was adjusted with the same glycol determined in the formulation to the desired end pigment concentration, the grinding media was separated off, and the pigment preparation was isolated.

The pigment preparations described in the Table below were produced in accordance with the method described above, the following constituents being used in the amounts stated so as to give 500 parts of each pigment preparation.

TABLE 1

| Formulations | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | | | | | | | | g | | | | | | | | |
| P.Y. 83 | 125 | 150 | | | | | | | | | | | | | | |
| P.Y. 213 | | | 150 | 125 | 125 | 125 | | | | | | | | | | |
| P.Y. 214 | | | | | | | 150 | 100 | | | | | | | | |
| P.R. 257 | | | | | | | | | 125 | 100 | | | | | | |
| P.R. 175 | | | | | | | | | | | 100 | 125 | | | | |
| P.R. 254 | | | | | | | | | | | | | 150 | 125 | | |
| P.BI. 15 | | | | | | | | | | | | | | | 100 | 125 |
| P.BI. 15:1 | | | | | | | | | | | | | | | | |
| P.BI. 15:3 | | | | | | | | | | | | | | | | |
| P.G. 7 | | | | | | | | | | | | | | | | |
| P.G. 36 | | | | | | | | | | | | | | | | |
| P.Bk. 7 | | | | | | | | | | | | | | | | |
| Dimethylpolypropylen glycol | | | | 325 | | | | | | | | | | | | |
| Propylenglycol | 325 | 290 | 275 | | 325 | | 275 | 365 | 325 | 350 | 325 | 325 | 325 | 365 | 350 | 325 |
| Polypropylenglycol | | | | | | 325 | | | | | | | | | | |
| Epoxidized novolak reacted with amines dissolved in fatty alcohol polyglycolether | 50 | | | | | | | | | | | | | | 30 | |
| Castor oil esterfied with abietic acid and ethoxylated | | 30 | 75 | | | | 40 | | | | | | | | | 50 |
| Oligopropylene Terephthalate | | | | 50 | 50 | 50 | | | | | | | 25 | 50 | | |
| Tristyryl phenol-polyethylene glycol-phosphoric acid ester | | | | | | | | 35 | | | | | | | | |
| Tristyryl phenol-polyethylene glycol with 15-25 EO | | | | | | | | | 50 | | | | | | | |
| Fatty alcohol polyglycolether | | | | 25 | 25 | 25 | 20 | | | | 75 | | | | | |
| Tristyryl phenol-polyethylene glycol ether with 20-30 EO | | | | | | | | | | 25 | | | | | | |
| Alkyl ether sulphate, sodium salt | | | | | | | | | | | | | | | | |
| dialkyl sulfosuccinate esters | | 30 | | | | | | | | 25 | | | | | 20 | |
| ligninsulfonate | | | | | | | | | | | | 20 | | | | |
| Polycondensate of naphthalin sulfonate and formalkyl benzene | | | | | | | 15 | | | | | | | | | |
| styrene oxide ethylene oxide block copolymer | | | | | | | | | | | | 30 | | | | |

| Formulations | 17 | 18 | 19 | 20 | 21 | 22 | 23 | 24 | 25 | 26 | 27 | 28 | 29 | 30 |
|---|---|---|---|---|---|---|---|---|---|---|---|---|---|---|
| | | | | | | g | | | | | | | | |
| P.Y. 83 | | | | | | | | | | | | | | |
| P.Y. 213 | | | | | | | | | | | | | | |
| P.Y. 214 | | | | | | | | | | | | | | |
| P.R. 257 | | | | | | | | | | | | | | |
| P.R. 175 | | | | | | | | | | | | | | |
| P.R. 254 | | | | | | | | | | | | | | |
| P.BI. 15 | 100 | 125 | | | | | | | | | | | | |
| P.BI. 15:1 | | | | | | | | | | | | | | |
| P.BI. 15:3 | | | 125 | 150 | | | | | | | | | | |
| P.G. 7 | | | | | 125 | 150 | | | | | | | | |
| P.G. 36 | | | | | | | 125 | 150 | 150 | 150 | | | | |
| P.Bk. 7 | | | | | | | | | | | 125 | 100 | 100 | 100 |
| Dimethylpolypropylen glycol | | | | | | | | | 300 | | | 315 | | |
| Propylenglycol | 275 | 325 | 325 | 300 | 340 | 290 | 315 | | | 300 | 315 | | 315 | |
| Polypropylenglycol | | | | | | | | 300 | | | | | | 315 |
| Epoxidized novolak reacted with amines dissolved in fatty alcohol polyglycolether | | | | | | 30 | | | | | | | | |
| Castor oil esterfied with abietic acid and ethoxylated | | | | | | | | | | | | | | |
| Oligopropylene Terephthalate | 75 | | | | | | | 40 | | | 60 | 30 | 30 | 30 |
| Tristyryl phenol-polyethylene glycol-phosphoric acid ester | | 30 | | 25 | | | | | | | | | | |
| Tristyryl phenol-polyethylene glycol with 15-25 EO | | | | | | 25 | | | 50 | 50 | 50 | | | |
| Fatty alcohol polyglycolether | | | | | | | | | | | | 30 | 30 | 30 |
| Tristyryl phenol-polyethylene glycol ether with 20-30 EO | | | 50 | 25 | | | | | | | | | | |
| Alkyl ether sulphate, sodium salt | | | | | | 10 | | | | | | | | |
| dialkyl sulfosuccinate esters | | | | | | | | | | | | 30 | 30 | 30 |
| ligninsulfonate | | | | | | | | | 20 | | | | | |
| Polycondensate of naphthalin sulfonate and formalkyl | | 20 | | | | | | | | | | | | |

TABLE 1-continued

| | |
|---|---|
| benzene styrene oxide ethylene oxide block copolymer | 30 |

Assessment of the Pigment Preparation

For assessing the storage stability of the dispersions, the viscosity was measured directly after production of the preparation and also after four-week storage at 50° C. and after storage in a climatically controlled chamber at <0° C.

No significant increase of viscosity or precipitation was detected after the storage time at 50° C. or below 0° C.

Example for Dyeing the Polyacrylinitrile Fiber:

20 g of crude polyacrilonitrile are dissolved in ca. 80 g of hot dimethylsulphoxid. 10 g of pigment preparation as prepared in Examples 1 to 30 in Table 1 are diluted with 20 g of dimethylsulphoxid. An amount of 5 g of the diluted pigment preparation is added to obtain the desired depth of shade and mixed.

The polyacrilonitrile coloured is extruded to obtain the fibers already coloured into a bath containing dimethylsulphoxid and water.

The fiber is stretched and washed in following baths.

The invention claimed is:

1. A process for mass dyeing of polyacrylonitrile, comprising the step of incorporating a pigment preparation into a solution of acrylonitrile polymer or copolymer, wherein the pigment preparation comprises
   10 to 60% by weight of a pigment,
   15 to 85% by weight of a glycol-based solvent,
   5 to 25% by weight of a surfactant, and
   0 to 10% by weight of additives,
the percentages being based on the total weight of the pigment preparation.

2. The process as claimed in claim 1, wherein the pigment preparation is incorporated in an amount of 2 to 20% by weight, based on the weight of the dyed polyacrylonitrile mass.

3. The process as claimed in claim 1, further comprising the step of extruding the mixture of acrylonitrile polymer or copolymer and pigment preparation into a bath to obtain polyacrylonitrile fibers already coloured.

4. The process as claimed in claim 1, wherein the glycol-based solvent comprises a glycolic compound selected from the group consisting of ethylene glycol, propylene glycol, diethylene glycol, dipropylene glycol, butylene glycol, triethylene glycol, polyethylene glycol, alpha-methyl-omega-hydroxy-polyethylene glycol ether, dimethyl polyethylene glycol ether, polypropylene glycol, dimethyl polypropylene glycol ether, and copolymers of ethylene glycol and propylene glycol.

5. The process as claimed in claim 1, wherein the pigment is an organic pigment selected from the group consisting of monoazo, disazo, laked azo, β-naphthol, naphthol AS, benzimidazolone, disazo condensation, and azo metal complex pigments, phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline, diketopyrrolopyrrole pigments, and acidic to alkaline carbon black.

6. The process as claimed in claim 1, wherein the pigment is an inorganic pigment selected from the group consisting of titanium dioxides, zinc sulfides, zinc oxides, iron oxides, manganese iron oxides, chromium oxides, ultramarine, nickel or chromium antimony titanium oxides, cobalt oxides, mixed oxides of cobalt and aluminum, rutile mixed-phase pigments, sulfides of rare earths, bismuth vanadates, and extender pigments.

7. A pigment preparation comprising
   10 to 60% by weight of a pigment,
   15 to 85% by weight of propylene glycol,
   5 to 25% by weight of a surfactant, and
   0 to 10% by weight of additives,
the percentages being based on the total weight of the pigment preparation and wherein the pigment preparation is substantially free of water.

8. The pigment preparation as claimed in claim 7, consisting of
   10 to 60% by weight of a pigment,
   15 to 85% by weight of propylene glycol,
   5 to 25% by weight of a surfactant, and
   0 to 10% by weight of additives selected from the group consisting of thickeners, preservatives, biocides, viscosity stabilizers, emulsifiers, grinding assistants, fillers, hydrotropic retention agents, antisettling agents, light stabilizers, antioxidants, devolatilizers, defoamers, foam reducers, anticaking agents and rheology improvers, the percentages being based on the total weight of the pigment preparation.

9. The pigment preparation as claimed in claim 7, wherein the pigment is selected from the group consisting of C.I. Pigment Black 7, C.I. Pigment Blue 15:3, C.I. Pigment Green 7, C.I. Pigment Yellow 213, and C.I. Pigment Red 254.

10. A process for producing a pigment preparation as claimed in claim 7, comprising the step of dispersing the pigment in the form of powder or granules in propylene glycol and surfactant, optionally milling, until the particle size reaches less than 1 μm, and optionally mixing in the presence of additives.

* * * * *